United States Patent
Kim et al.

(10) Patent No.: US 10,598,558 B2
(45) Date of Patent: Mar. 24, 2020

(54) PRESSURE SENSING ELEMENT

(71) Applicant: ELECTRONICS AND TELECOMMUNICATIONS RESEARCH INSTITUTE, Daejeon (KR)

(72) Inventors: Seong Hyun Kim, Daejeon (KR); Su Jae Lee, Daejeon (KR); Kyoung Ik Cho, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 176 days.

(21) Appl. No.: 15/890,846

(22) Filed: Feb. 7, 2018

(65) Prior Publication Data

US 2018/0246000 A1   Aug. 30, 2018

(30) Foreign Application Priority Data

Feb. 28, 2017 (KR) .................. 10-2017-0026630
Jul. 7, 2017   (KR) .................. 10-2017-0086657

(51) Int. Cl.
*G01L 9/00* (2006.01)
*G01L 1/18* (2006.01)
*G01L 19/06* (2006.01)
*G01L 1/16* (2006.01)

(52) U.S. Cl.
CPC ............ *G01L 19/0618* (2013.01); *G01L 1/16* (2013.01); *G01L 1/18* (2013.01); *G01L 9/008* (2013.01); *G01L 9/0044* (2013.01); *G01L 9/0052* (2013.01)

(58) Field of Classification Search
CPC ..... G01L 13/205; G01L 19/141; G01L 1/243; G01L 9/0077; G01L 19/0618; G01L 9/008; G01L 9/0044; G01L 9/0052; G01L 9/00; H01L 2924/16151; H01L 2224/73265; H01L 2224/48091; H01L 2924/10155; H01L 2924/00014; G06F 3/0421; G06F 2203/04109; G06F 3/042; G01D 5/268
See application file for complete search history.

(56) References Cited

U.S. PATENT DOCUMENTS

| | | | |
|---|---|---|---|
| 7,600,432 B2 | 10/2009 | Nomura et al. | |
| 7,645,398 B2 | 1/2010 | Kim et al. | |
| 9,157,815 B2 | 10/2015 | Kyung et al. | |
| 2005/0190068 A1* | 9/2005 | Gentry | A61B 5/11 340/665 |
| 2019/0250734 A1* | 8/2019 | Lee | G06F 3/044 |

FOREIGN PATENT DOCUMENTS

KR   10-0960633 B1   6/2010

* cited by examiner

*Primary Examiner* — Brandi N Hopkins
(74) *Attorney, Agent, or Firm* — Rabin & Berdo, P.C.

(57) ABSTRACT

Provided is a pressure sensing element including a first electrode, a pressure sensing unit on the first electrode, a second electrode disposed on the pressure sensing unit and having first and second points on a top surface thereof, a first elastic member on the second electrode, and a second elastic member on the first elastic electrode, wherein a thickness of the first elastic member decreases from the first point toward the second point, and a thickness of the second elastic member increases from the second point toward the first point.

8 Claims, 3 Drawing Sheets

PRESSURE SENSING ELEMENT

CROSS-REFERENCE TO RELATED APPLICATIONS

This U.S. non-provisional patent application claims priority under 35 U.S.C. § 119 to Korean Patent Application Nos. 10-2017-0026630, filed on Feb. 28, 2017, and 10-2017-0086657, filed on Jul. 7, 2017, the entire contents of which are hereby incorporated by reference.

BACKGROUND

The present inventive concepts relates to a pressure sensing element, and more particularly, to enlargement of a sensing range of a pressure sensing element.

Typically, a pressure sensor may be used for converting a degree of pressure to an electrical signal and measuring a degree of applied pressure. The pressure sensor may be divided, according a principle of sensing a pressure, into a piezoresistance type pressure sensor, a piezoelectric pressure sensor, and a capacitive type pressure sensor, etc. The piezoresistance type pressure sensor senses a pressure through a change in resistivity or resistance due to a change in interatomic interval or structure of a used material to which strain or stress is applied. The capacitive type pressure sensor senses a change in electrostatic capacity according to a pressure. The piezoelectric type pressure sensor senses a voltage generated in both ends of a material having a polarized piezoelectric property through an electric field change therein, when strain or stress is applied to the piezoelectric material.

Nowadays, a pressure sensor is used in various fields such as a touch sensor of a mobile device, or a tactile sensor of a robot, etc. Accordingly, a precise pressure sensor, which may effectively process a pressure signal in a wide range, is required to be used in various environments.

SUMMARY

The present disclosure provides a pressure sensing element having a wide sensing range.

Issues to be addressed in the present disclosure are not limited to those described above and other issues unmentioned above will be clearly understood by those skilled in the art from the following description.

According to example embodiments of the present inventive concepts, a pressure sensing element include: a first electrode; a pressure sensing unit on the first electrode; a second electrode disposed on the pressure sensing unit and having first and second points on a top surface thereof; a first elastic member on the second electrode; and a second elastic member on the first elastic electrode. The thickness of the first elastic member may decrease from the first point toward the second point.

The thickness of the second elastic member may increase from the second point toward the first point.

In some example embodiment, an elastic coefficient of the first elastic member may be greater than that of the second elastic member.

In some example embodiment, the first elastic member may not overlap the second point, and the second elastic member may not overlap the first point.

In some example embodiment, the thickness of the first elastic member and the thickness of the second elastic member may vary linearly.

In some example embodiment, a sum of the thickness of the first elastic member and the thickness of the second elastic member may be constant on the second electrode.

In some example embodiment, the pressure sensing unit may include a piezoelectric material or a piezoresistance material.

In some example embodiment, the first elastic member and the second elastic member may include an elastic rubber.

In some example embodiment, the pressure sensing element may further include a protection layer disposed on the first elastic member and the second elastic member.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
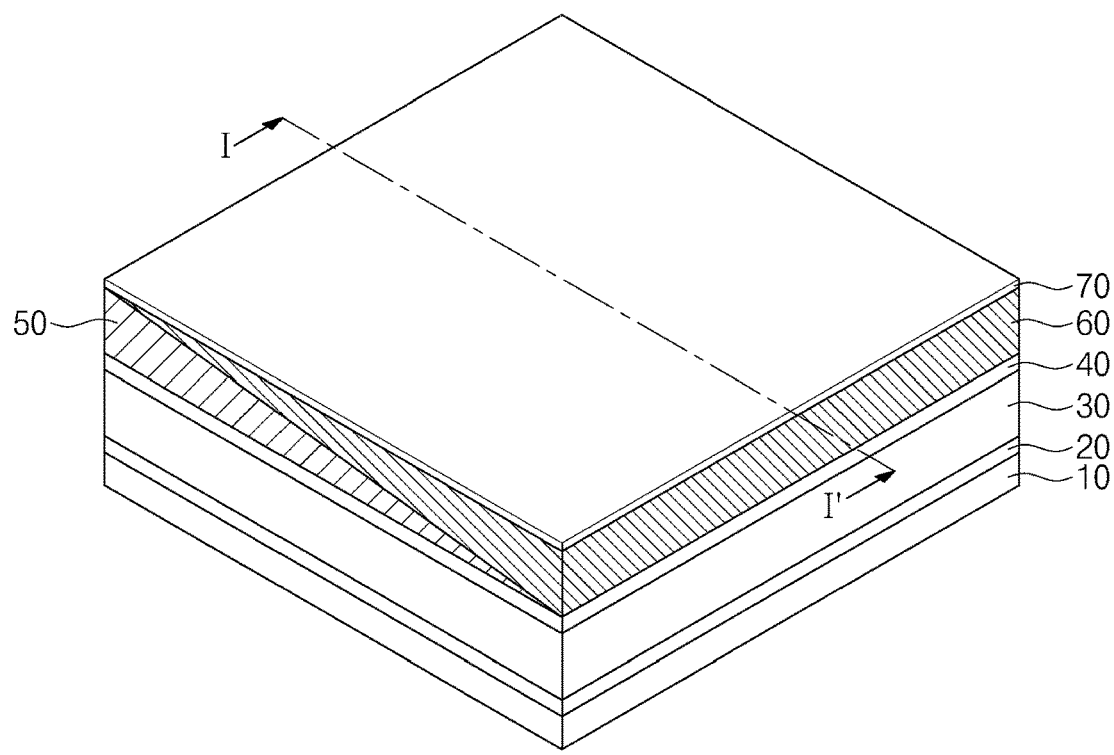
FIG. 1 is a perspective view for explaining a pressure sensing element according to embodiments of the inventive concept.

The embodiments of the present disclosure will now be described with reference to the accompanying drawings for sufficiently understating a configuration and effects of the inventive concept. However, the inventive concept is not limited to the following embodiments and may be embodied in different ways, and various modifications may be made thereto. The embodiments are just given to provide complete disclosure of the inventive concept and to provide thorough understanding of the inventive concept to those skilled in the art. It will be understood to those skilled in the art that the inventive concept may be performed in a certain suitable environment.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof When a film (or layer) is referred to as being 'on' another film (or layer) or substrate, it can be directly on the other film (or layer) or substrate, or intervening films (or layers) may also be present.

It will be understood that, although the terms first, second, third etc. may be used herein to describe various elements, components, regions, layers and/or sections, these elements, components, regions, layers and/or sections should not be limited by these terms. The terms may be used herein only to distinguish one region or film (or layer) from another region or film (or layer). Therefore, a layer referred to as a first film in one embodiment can be referred to as a second film in another embodiment. An embodiment described and exemplified herein includes a complementary embodiment thereof. Like reference numerals refer to like elements throughout.

Unless otherwise defined, all terms used herein have the same meaning as commonly understood by one of ordinary skill in the art to which this disclosure pertains.

Hereinafter, a pressure sensing element according to the inventive concept will be described with reference to the accompanying drawings.

Figure 2:
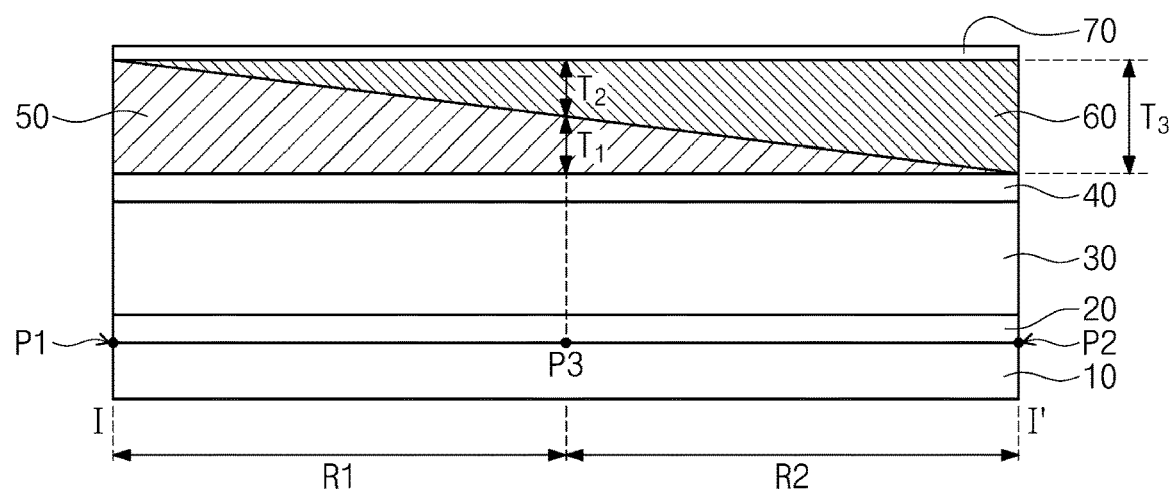
FIGS. 2 to 4 are cross-sectional views for explaining a pressure sensing element according to embodiments of the inventive concept.
Figure 3:
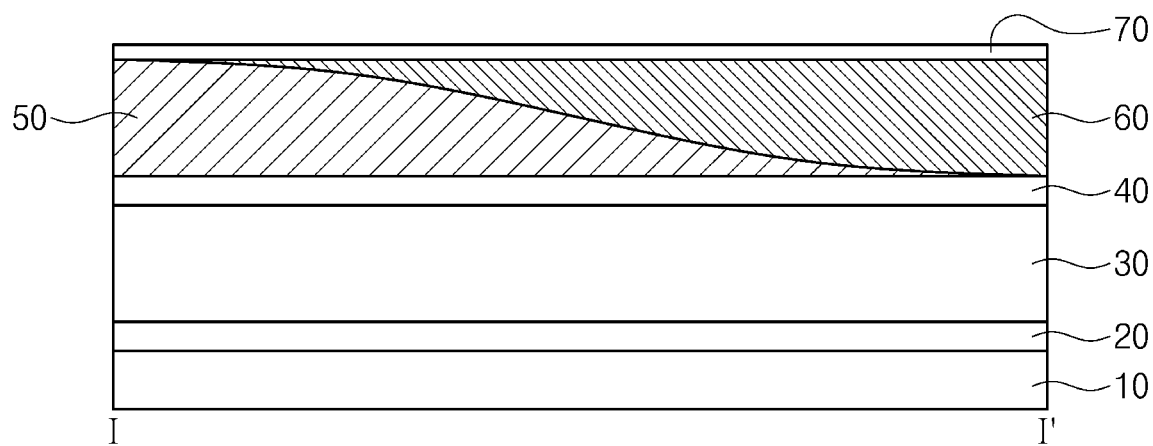
Figure 4:
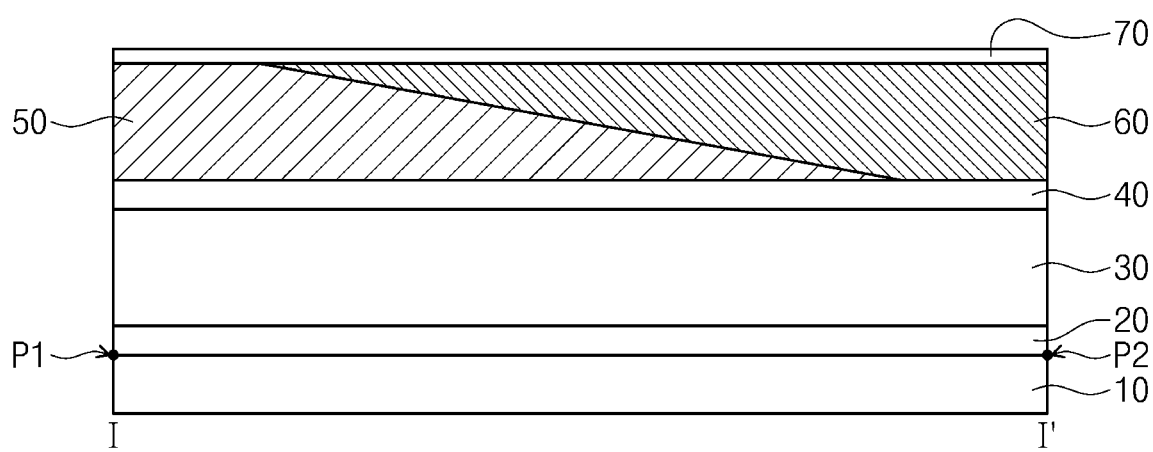

FIG. 1 is a perspective view for explaining a pressure sensing element according to embodiments of the inventive concept. FIGS. 2 to 4 are cross-sectional views for explaining a pressure sensing element according to embodiments of the inventive concept, which are viewed along line I-I' of FIG. 1.

In relation to FIGS. 1 and 2, a pressure sensing element may include a substrate 10, a first electrode 20, a pressure sensing unit 30, and a second electrode 40. The substrate 10 may include a solid material, a flexible material, or an elastic material. The first and second electrodes 20 and 40 may be disposed on the substrate 10. Each of the first and second electrodes 20 and 40 may include a metal or transparent electro-conductive material. The first and second electrodes 20 and 40 may be disposed to be separated from each other. The pressure sensing unit 30 may be provided between the first and second electrodes 20 and 40.

The pressure sensing unit 30 may include a piezoelectric material. For example, the pressure sensing unit 30 may include a perovskite material such as lead zirconate titanate (Pb(Ti, Zr)O$_3$, PZT) or barium titanate (BaTiO$_3$). When a prescribed pressure is applied to a piezoelectric material, a voltage may be generated at both ends of the piezoelectric material.

Alternatively, the pressure sensing unit 30 may include a piezoresistance material. For example, the pressure sensing unit 30 may include a pressure sensitive polymer such as a pressure-sensitive or pressure-activated conductive rubber. The pressure sensitive polymer may have a conductive property when a prescribed pressure is applied thereto, and lose the conductive property when the pressure is removed therefrom. At this point, the first and second electrodes 20 and 40 may measure a resistivity change or a resistance change of the pressure sensing unit 30.

The pressure sensing element may include a first elastic member 50 and a second elastic member 60 on the second electrode 40. Due to the first and second elastic members 50 and 60, the pressure sensing unit 30 may gradually react to the pressure. For example, the first and second elastic members 50 and 60 may disperse a pressure applied to the pressure sensing unit 30. The first and second elastic members 50 and 60 may include an elastic rubber. For example, the elastic rubber may include a natural rubber or a synthetic rubber.

The first elastic member 50 may be disposed on a first region R1 of the substrate 10. The second elastic member 60 may be disposed on a second region R2 of the substrate 10. The first elastic member 50 may be extended onto the second region R2 from the first region R1, the thickness T$_1$ of which becomes smaller toward the second region R2. The second elastic member 60 may be extended onto the first region R1 from the second region R2, the thickness T$_2$ of which becomes smaller toward the first region R1. At this point, the thickness T$_1$ of the first elastic member 50 and the thickness T$_2$ of the second elastic member 60 may vary linearly. Unlike these, as illustrated in FIG. 3, the thickness T$_1$ of the first elastic member 50 and the thickness T$_2$ of the second elastic member 60 vary continuously but not linearly. A sum T$_3$ of the thickness T$_1$ of the first elastic member 50 and the thickness T$_2$ of the second elastic member 60 may be constant on the second electrode 40. The first elastic member 50 and the second elastic member 60 may overlap two-dimensionally. For example, the second elastic member 60 may be disposed on the first elastic member 50 to cover the first elastic member 50. Alternatively, as illustrated in FIG. 4, a portion of the first elastic member 50 and a portion of the second elastic member 60 may overlap two-dimensionally. For example, the second elastic member 60 may not be disposed on a first point P1 of the first region R1. The first elastic member 50 may not be disposed on a second point P2 of the second region R2. The first elastic member 50 and the second elastic member 60 may have different elastic moduli from each other. For example, an elastic coefficient E$_1$ of the first elastic member 50 may be greater than an elastic coefficient E$_2$ of the second elastic member 60.

According to other embodiments, the pressure sensing element may further include a protection layer 70. The protection layer 70 may protect the first elastic member 50 and the second elastic member 60 from an external shock. The protection layer 70 may include a plastic film.

The pressure sensing element according to embodiments of the inventive concept may have a wide sensing range. Hereinafter, a description will be provided with reference to an embodiment of FIG. 2 in which the thickness T$_1$ of the first elastic member 50 and the thickness T$_2$ of the second elastic member 60 vary linearly.

In relation to FIG. 2 again, the first elastic member 50 and the second elastic member 60 may have different thicknesses at the first point P1 and the second point P2. For example, the thickness T$_1$ of the first elastic member 50 may decrease from the first point P1 toward the second point P2, and the thickness T$_2$ of the second elastic member 60 may increase from the first point P1 toward the second point P2. In addition, the first elastic member 50 and the second elastic member 60 may have different elastic moduli. Accordingly, a spring constant k$_1$ of the first elastic member 50 and a spring constant k$_2$ of the second elastic member 60 may be expressed as Equation (1).

$$k_1 = \frac{A \cdot E_1}{T_1} \qquad (1)$$
$$k_2 = \frac{A \cdot E_2}{T_2}$$

where E$_1$ denotes the elastic coefficient of the first elastic member 50, T$_1$ denotes the thickness of the first elastic member 50 at an arbitrary point P3, E$_2$ denotes the elastic coefficient of the second elastic member 60, T$_2$ denotes the thickness of the second elastic member 60, and A denotes an area to which a pressure is applied.

At the arbitrary point P3, a total spring constant k$_3$ of the first elastic member 50 and the second elastic member 60 may be expressed as Equation (2).

$$k_3 = \frac{k_1 \cdot k_2}{k_1 + k_2} = \frac{A(E_1 \cdot E_2)}{E_2 T_3 + (E_1 \cdot E_2) T_2} \qquad (2)$$

where $T_3$ denotes a sum of the thickness $T_1$ of the first elastic member 50 and the thickness $T_2$ of the second elastic member 60 at the arbitrary point P3.

At the arbitrary point P3, when the thicknesses of the first elastic member 50 and the second elastic member 60 are changed by $\Delta T$ by applying a pressure on the second elastic member 60, a force F applied to the pressure sensing unit 30 may be expressed as Equation (3).

$$F = \frac{\Delta T \cdot A(E_1 \cdot E_2)}{E_2 T_3 + (E_1 \cdot E_2) T_2} \quad (3)$$

Figure 5:
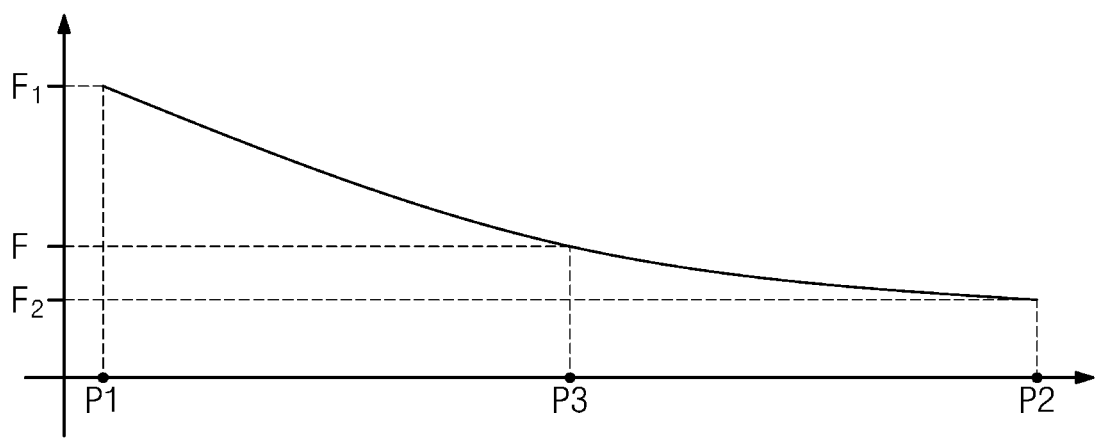
FIG. 5 is a graph for explaining a force applied to a pressure sensing unit of a pressure sensing element.

According to Equation (3), forces of different magnitudes may be delivered to the pressure sensing unit 30 with respect to the same pressure. FIG. 5 is a graph for explaining a force applied to the pressure sensing unit 30 of the pressure sensing element.

In relation to FIG. 5, a force $F_1$, which is applied to the pressure sensing unit 30 at the first point P1 at which only the first elastic member 50 is disposed, may be $$F_1 = \frac{\Delta T}{T} A \ E_1,$$

a force $F_2$, which is applied to the pressure sensing unit 30 at the second point P2 at which only the second elastic member 60 is disposed, may be $$F_2 = \frac{\Delta T}{T} A \ E_2.$$

In other words, as illustrated in FIG. 5, a force F applied to the pressure sensing unit 30 may have a range from $$F_2 = \frac{\Delta T}{T} A \ E_2 \text{ to } F_1 = \frac{\Delta T}{T} A \ E_1.$$

The pressure sensing element according to the inventive concept may sense a pressure at different positions according to a sensing range of the pressure sensing unit 30 and an external pressure. For example, even though a pressure exceeding a measurement range is applied to the second elastic member 60 having a low elastic coefficient on the second point P2, the pressure may be sensed through the first elastic member 50 having a high elastic coefficient at the first point P1. Accordingly, the pressure sensing element may have a wide sensing range.

A pressure sensing element according to embodiments of the inventive concept may sense a pressure at different positions according to a sensing range of a pressure sensing unit and an external pressure. Even though a pressure exceeding a measurement range is applied onto a point having a low elastic coefficient, the pressure may be sensed at a point having a high elastic coefficient. Accordingly, the pressure sensing element may have a wide sensing range.

Although an embodiment of the present disclosure has been described with reference to the accompanying drawings, it should be understood that those skilled in the art can carry out other modifications without changing its technical spirit or essential features. Therefore, the above-described embodiment of the present disclosure is merely exemplary in all aspects and should not be construed to be limited.

What is claimed is:

1. A pressure sensing element comprising:
   a first electrode, the first electrode including a first point located on a left side of the first electrode and a second point located on a right side of the first electrode;
   a pressure sensing unit on the first electrode;
   a second electrode disposed on the pressure sensing unit;
   a first elastic member on the second electrode; and
   a second elastic member on the first elastic electrode,
   wherein a thickness of the first elastic member decreases along a direction from the first point toward the second point, and
   a thickness of the second elastic member decreases along a direction from the second point toward the first point.

2. The pressure sensing element according to claim 1, wherein an elastic coefficient of the first elastic member is greater than an elastic coefficient of the second elastic member.

3. The pressure sensing element according to claim 1, wherein the first elastic member does not overlap the second point, and the second elastic member does not overlap the first point.

4. The pressure sensing element according to claim 1, wherein the thickness of the first elastic member and the thickness of the second elastic member vary linearly.

5. The pressure sensing element according to claim 1, wherein a sum of the thickness of the first elastic member and the thickness of the second elastic member is constant on the second electrode.

6. The pressure sensing element according to claim 1, wherein the pressure sensing unit comprises a piezoelectric material or a piezoresistance material.

7. The pressure sensing element according to claim 1, wherein the first elastic member and the second elastic member comprise an elastic rubber.

8. The pressure sensing element according to claim 1, further comprising:
   a protection layer disposed on the first elastic member and the second elastic member.

* * * * *